US005896829A

United States Patent [19]

Rothenberg et al.

[11] Patent Number: 5,896,829

[45] Date of Patent: Apr. 27, 1999

[54] HEAD-ONLY ANIMAL EXPOSURE CHAMBERS

[75] Inventors: Simon J. Rothenberg, North Wales; George Dearlove, Landenberg; John Barnett, Schwenksville; Daniel Dewees, Warminster; William Ehrhart, Plumsteadville, all of Pa.

[73] Assignee: Genzyme Transgenics Corporation, Framingham, Mass.

[21] Appl. No.: 08/947,315

[22] Filed: Oct. 8, 1997

[51] Int. Cl.[6] .............................. A61D 7/04; A01K 1/03

[52] U.S. Cl. .............................. 119/417; 119/420

[58] Field of Search .............................. 119/417, 418, 119/420; 128/200.14, 204.18, 203.12

[56] References Cited

U.S. PATENT DOCUMENTS

| | | | |
|---|---|---|---|
| 4,348,985 | 9/1982 | Leong | 119/420 |
| 4,721,060 | 1/1988 | Cannon et al. | 119/420 |
| 4,781,146 | 11/1988 | Spengler | 119/420 |
| 5,297,502 | 3/1994 | Jaeger | 119/420 |
| 5,626,130 | 5/1997 | Vincent et al. | 119/420 X |

*Primary Examiner*—Michael J. Carone
*Assistant Examiner*—Elizabeth Shaw
*Attorney, Agent, or Firm*—Woodcock Washburn Kurtz Mackiewicz & Norris LLP

[57] ABSTRACT

Animal exposure chambers are provided which have a radial configuration about an axis of air flow and tapered ports to more comfortably accommodate the animals during exposure.

17 Claims, 6 Drawing Sheets

HEAD-ONLY ANIMAL EXPOSURE CHAMBERS

FIELD OF THE INVENTION

The present invention is directed to head-only chambers for exposing animals to air-borne substances and, more particularly, to chambers which occupy minimal space and provide greater comfort to the animals during exposure.

BACKGROUND OF THE INVENTION

So-called "head-only" exposure chambers have increasingly replaced whole body exposure chambers for pharmaceutical testing. In such chambers, the head (and, in most instances, neck) of a rabbit, dog, or some other animal of interest is exposed for an extended period of time to a stream of air in which the pharmaceutical is entrained. Most known head only chambers, however, are relatively large devices. It is not uncommon, for example, for a head only chamber which accommodates eight dogs to occupy an area of about 144 square feet. Many of the known chamber designs also place undue physical stress on the animals employed.

Consequently, there remains a need in the art for head-only exposure chamber designs which are more compact and/or provide a greater level of comfort to the animals.

BRIEF DESCRIPTION OF THE INVENTION

These and other objects are satisfied by the present invention, which provides head-only animal exposure chambers which have a radial configuration about an axis of air flow and tapered ports to more comfortably accommodate the animals during exposure. The angled surfaces, or tapered configuration, is preferred for relatively large-eared animals such as rabbits because it allows the animals' ears to lie back comfortably. The tapered configuration also matches the angle of the standard stocks used to hold rabbits. In preferred embodiments, the exposure chambers of the invention comprise at least one air inlet port and at least one air exhaust port. These ports generally define an axis within the chamber and, moreover, an axis of air flow. The chambers of the invention also comprise an inlet plate which is substantially perpendicular to these axes and in fluid communication with the inlet port, and an exhaust plate which is substantially parallel to the inlet plate and in fluid communication with the exhaust port. The inlet plate and the exhaust plate both have outer diameters defining closed surface shapes. A lateral surface extends between the inlet plate and the exhaust plate, and there are a plurality of animal ports within the lateral surface. These animal ports are adapted both to receive at least the head of an animal and to expose the animal's mouth and nose to air entering through the inlet port and passing through the chamber.

BRIEF DESCRIPTION OF THE DRAWINGS

The numerous objects and advantages of the present invention may be better understood by those skilled in the art by reference to the accompanying non-scale figures, in which.

DETAILED DESCRIPTION OF THE INVENTION

Figure 1:
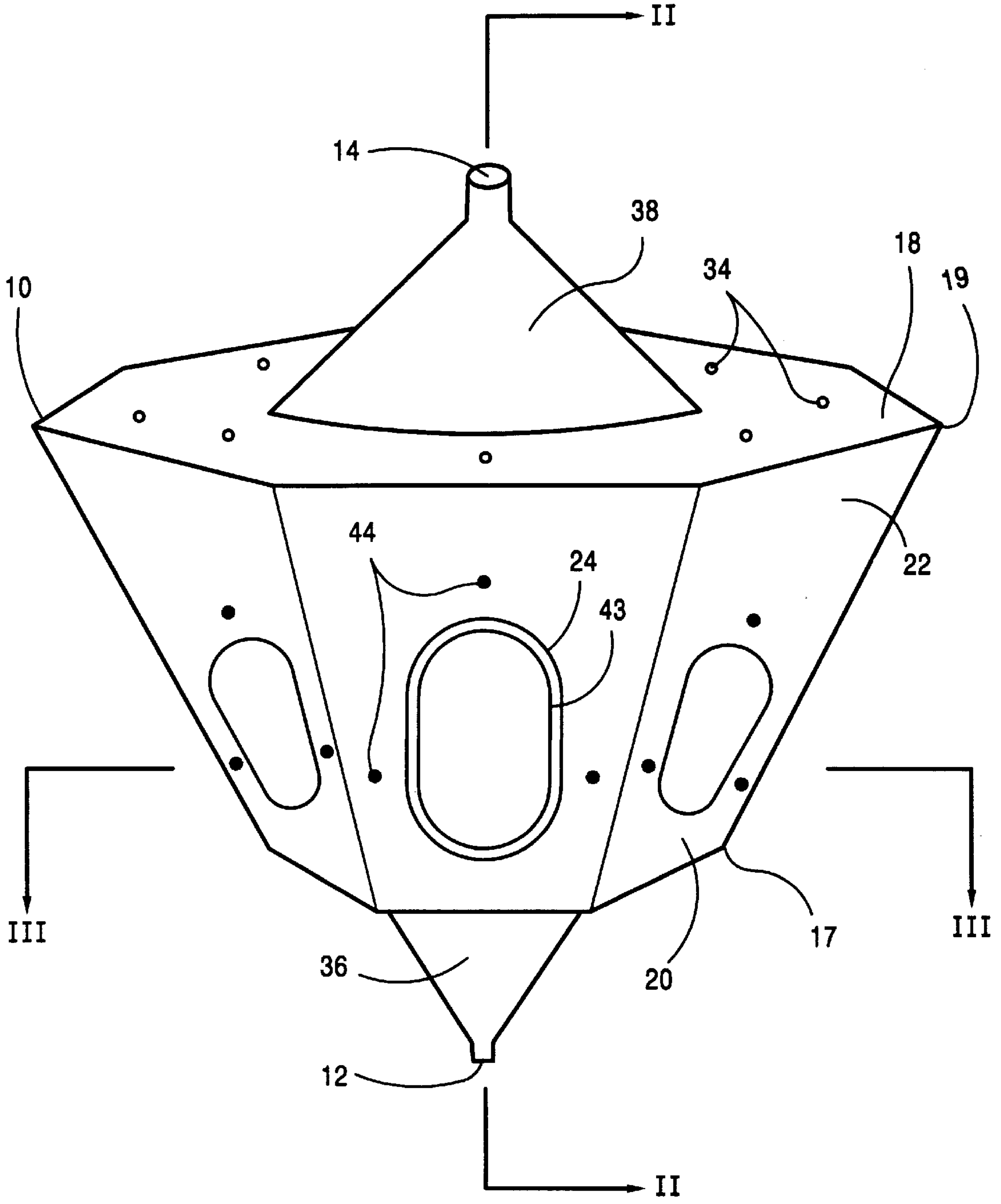
FIG. 1 is a perspective view of a chamber of the invention having generally octagonal shape.

FIGS. 1–5 show a representative exposure chamber 10 according to the invention having an octagonal shape. As can be seen, the chamber has a generally radial configuration about an axis defined by an air inlet port 12 and an air exhaust port 14. Representative inlet and exhaust ports according to the invention include tubes, fittings, or any other type of orifice through which a gas (including materials entrained therein) can pass.

The interior of chamber 10 is defined, in part, by inlet plate 16 and exhaust plate 18. These plates are substantially perpendicular to the axis defined by inlet port 12 and exhaust port 14 (and, hence, are substantially parallel to each other) and are in fluid communication, respectively, with these ports. Both plates have an outer diameter (17 and 19, respectively) which defines a closed surface shape such as, for example, a circle, triangle, tetrahedron, pentagon, hexagon, heptagon, octagon, or more complex polygon. The shapes defined by the inlet plate outer diameter and the exhaust plate outer diameter preferably are the same, but need not be so.

The respective outer diameters of the inlet plate and the exhaust plate can be the same or different, although it is preferred (as shown in FIGS. 1–5) that the exhaust plate outer diameter be somewhat greater than the inlet plate outer diameter. It will be recognized that outer diameter measurements in accordance with the present invention are taken between opposing points on the periphery of the plates having maximum separation. The angled sides of the chamber, or tapered configuration, is believed to be required for rabbits. This design affords the rabbits greater comfort and less stress due to forward crimping/bending of the ears caused by the vertical sides of standard inhalation exposure systems. The design is based on a continuation of the angle of the front piece of the restraining stocks, and takes into account the anatomical configuration of the rabbit head and ears. Angulation is not required for beagle dogs because the normal positioning of the ears is more perpendicular to the cephalo-caudal axis, in contrast with the rabbit, where the position is more parallel to the cephalo-caudal axis. The dog's ears normally lie forward down the sides of the dog's head. A configuration in which the dimensions of inlet plate 16 and outlet plate 18 are almost identical can be used successfully for beagle pups. Where there is a difference in plate diameter, the larger plate should have an outer diameter that is from about 1.2 to about 4 times larger, preferably about 1.5 to about 3 times larger, more preferably about 1.8 to about 2.2 times larger.

The exposure chambers of the invention have a lateral surface 20 extending between inlet plate 16 and exhaust plate 18. This lateral surface preferably is a rigid material which is bolted, nailed, glued, or otherwise attached to the inlet and exhaust plates. In preferred embodiments, the lateral surface is formed by a plurality of individual panels 22 which are attached to the plates.

Figure 2:
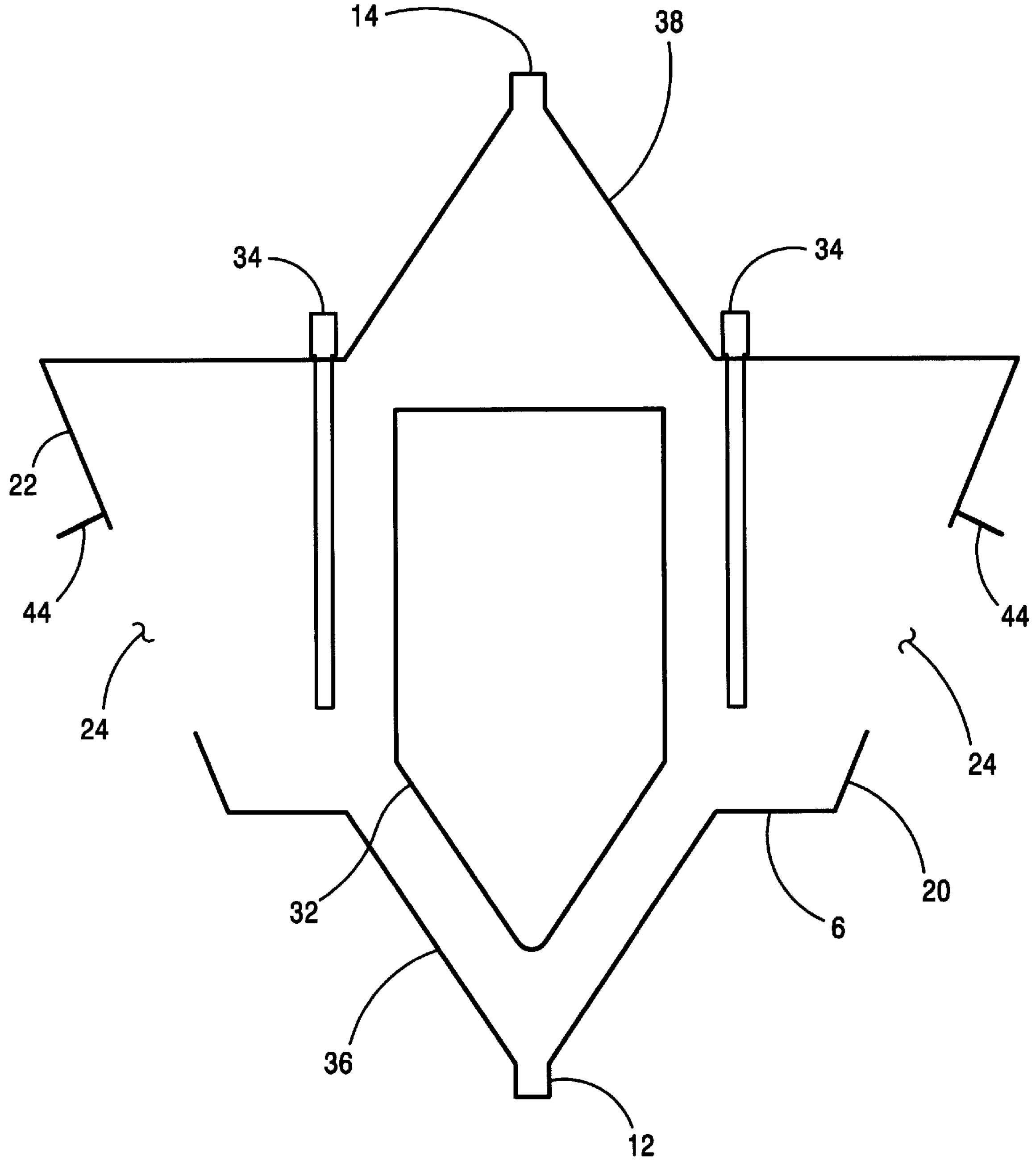
FIG. 2 is a cross-sectional view of the chamber shown in FIG. 1, taken along line II—II.
Figure 3:
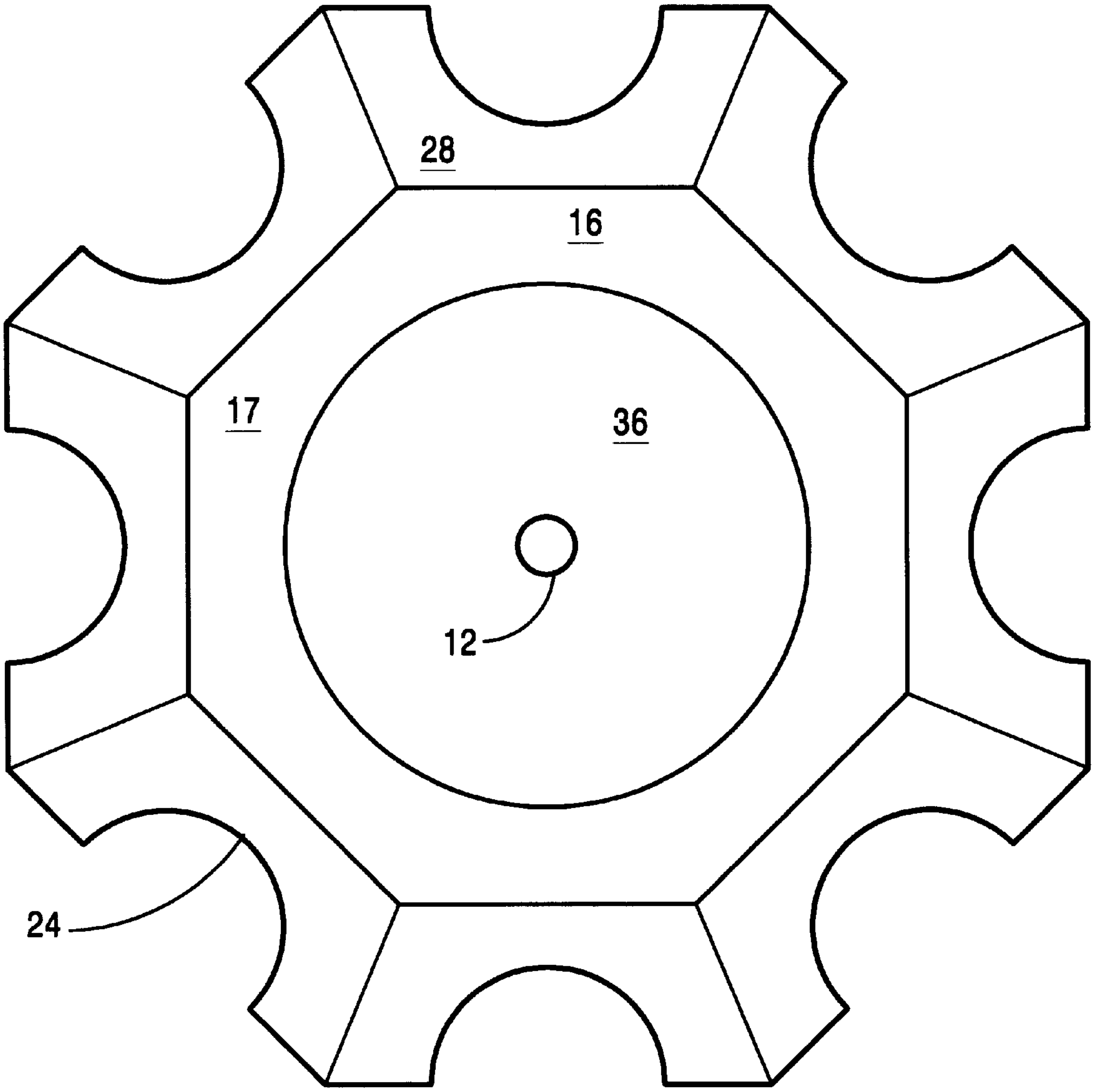
FIG. 3 is a cross-sectional view of the chamber shown in FIG. 1, taken along line III—III.
Figure 4:
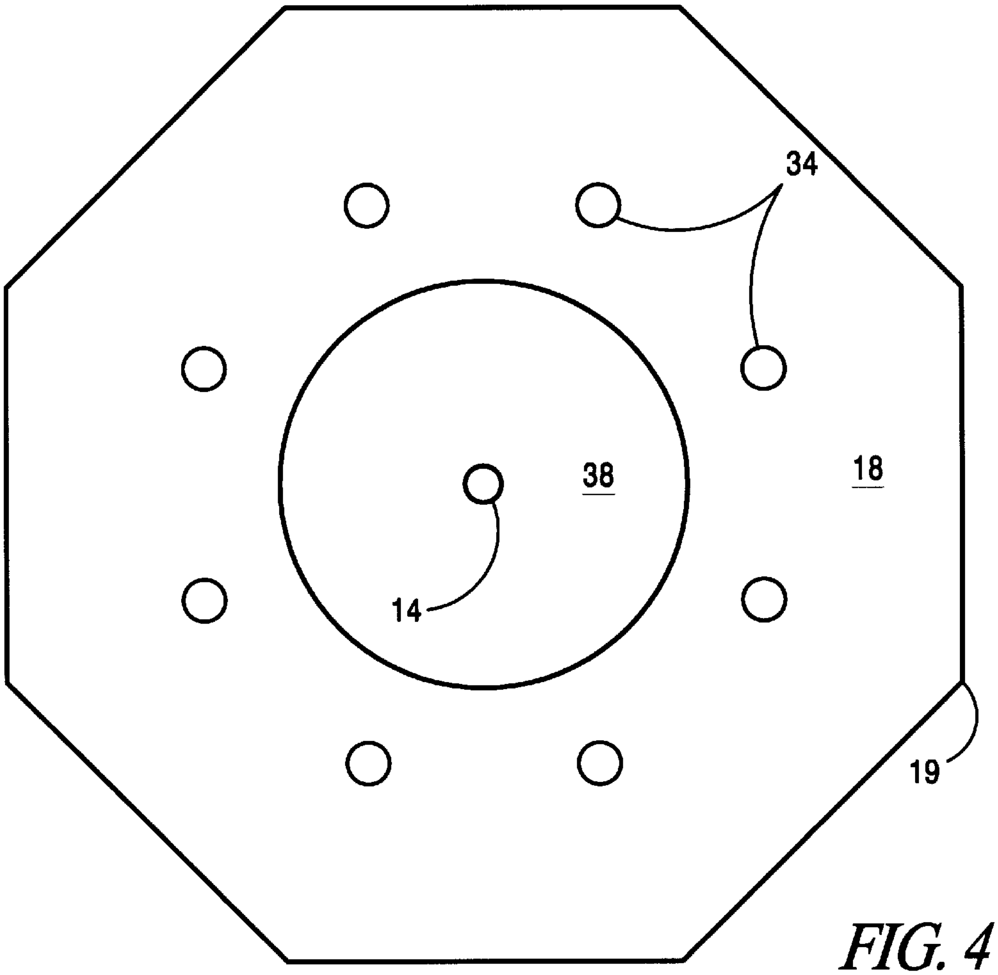
FIG. 4 is a top view of the chamber shown in FIG. 1.
Figure 5:
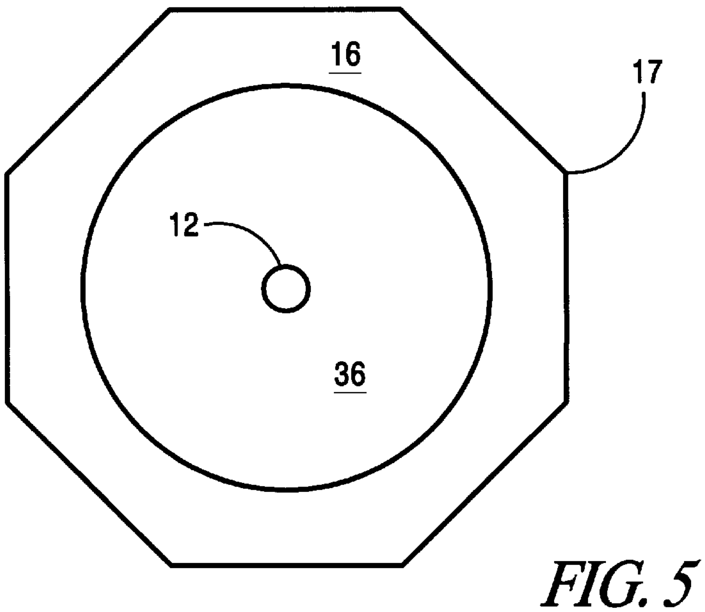
FIG. 5 is a bottom view of the chamber shown in FIG. 1.
Figure 6:
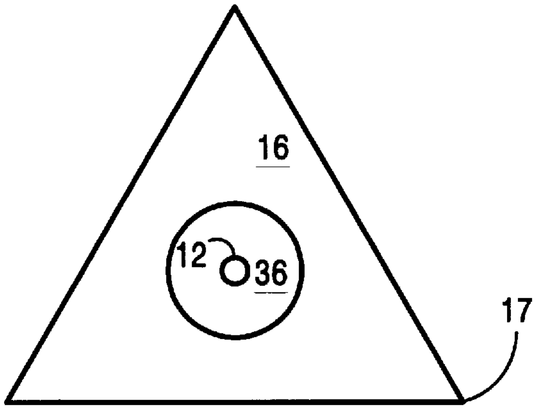
FIG. 6 is a top view of a chamber according to invention having a triangular cross-section.
Figure 7:
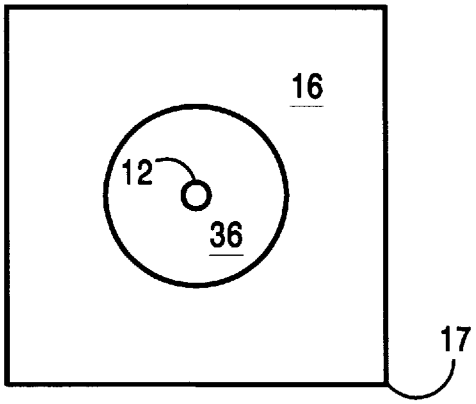
FIG. 7 is a top view of a chamber according to invention having a tetrahedral cross-section.
Figure 8:
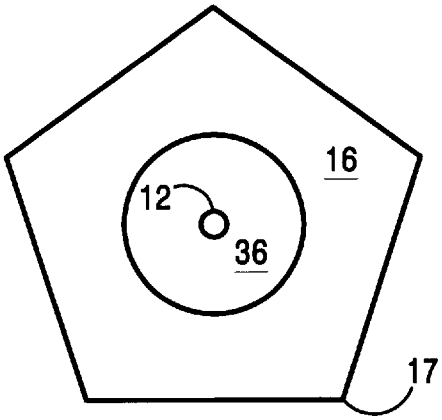
FIG. 8 is a top view of a chamber according to invention having a pentagonal cross-section.
Figure 9:
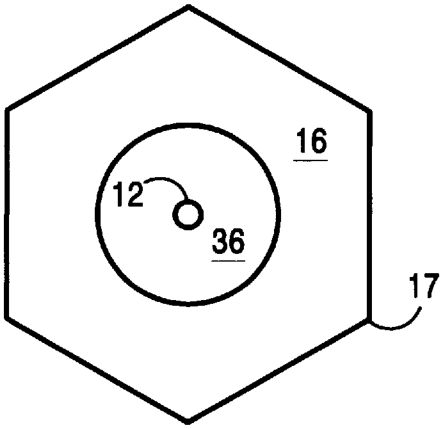
FIG. 9 is a top view of a chamber according to invention having a hexagonal cross-section.
Figure 10:
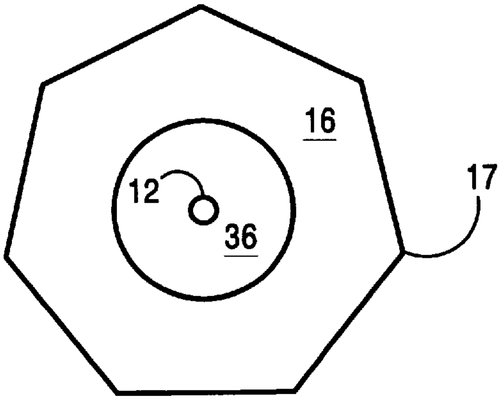
FIG. 10 is a top view of a chamber according to invention having a heptagonal cross-section.

The chambers of the invention preferably include an air flow distributor 32 disposed between inlet port 12 and exhaust port 14 and substantially along the axis defined by these ports. The flow distributor can have a wide variety of closed surface shapes. Preferably, flow distributor 32 has a tapered, conical portion opposite the inlet port, thereby forcing inlet air away from the center of the chamber and toward animal ports 24. As shown in FIGS. 1, 2, and 4, the chambers of the invention can further include sampling ports 34 or some other sealable aperture which permits periodic sampling of air passing through the chamber.

The exposure chambers of the invention also include an inlet surface 36 extending between inlet port 12 and inlet plate 16, and an exhaust surface 38 extending between exhaust port 14 and exhaust plate 18. These surfaces can have virtually any substantially tubular shape, although it is preferred that they be tapered to direct air flow and permit the chamber to be adaptable with inlet and exhaust plumbing having a diameter which is substantially less than the chamber diameter. In preferred embodiments, the inlet and exhaust surfaces both are substantially conical.

Figure 11:
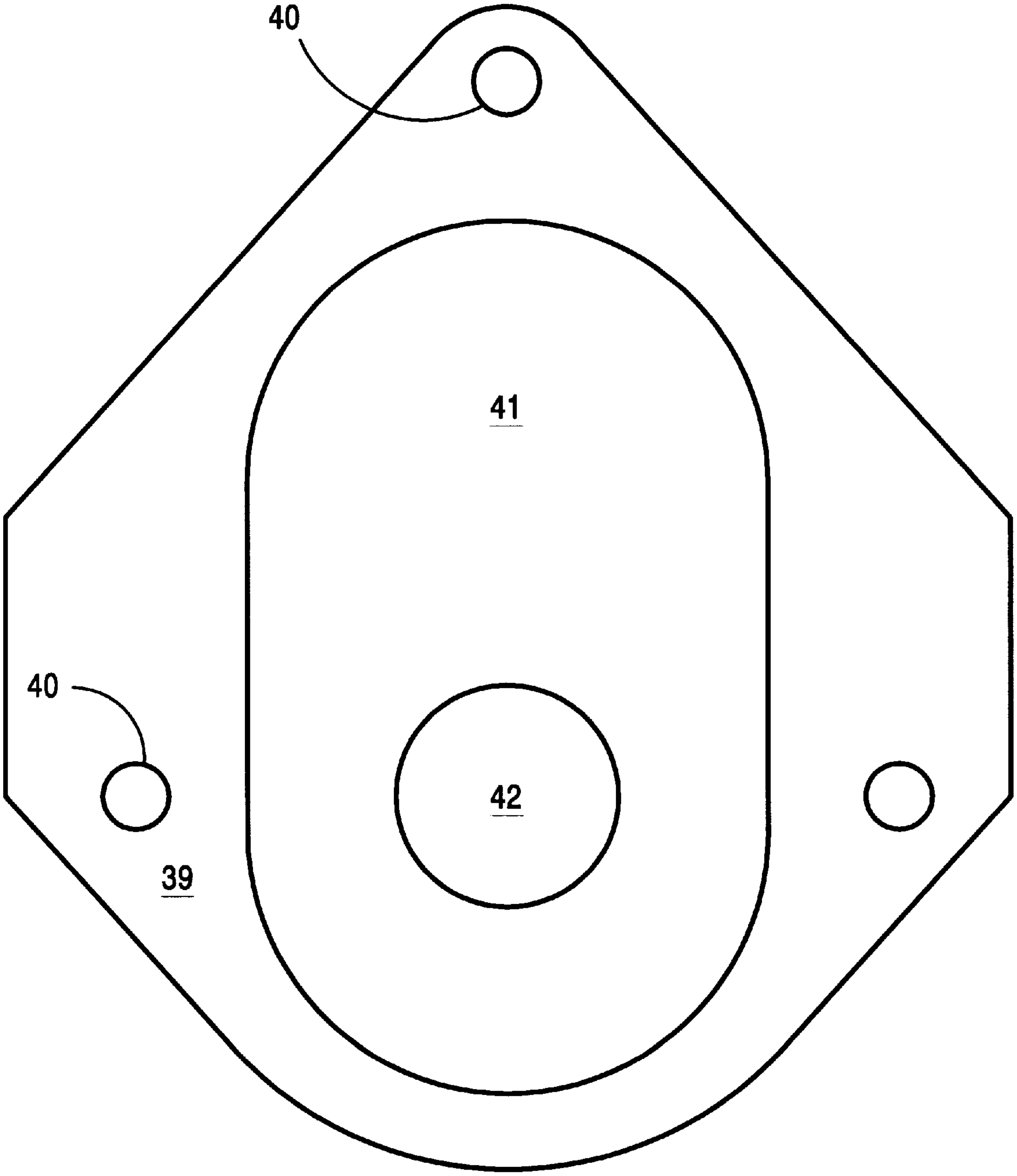
FIG. 11 is a top view of a collar frame assembly according to the invention.

Lateral surface 20 includes a plurality of animal ports 24 which are adapted to receive at least a head of an animal and permit exposure of the head to air passing through the chamber. Adaptation of animal ports 24 for this function can take any of the many forms known in the art, including, for example, appropriately sizing the ports and attaching relatively soft, flexible, gasket-like material to the periphery of the port. In preferred embodiments, lateral surface 20 includes a detachable collar frame which overlies animal port 24. FIG. 11 shows one preferred collar frame 39 into which bolt holes 40 have been drilled in substantially the same configuration as attachment studs 44 on lateral surface 20. Collar frame 39 includes latex rubber sheeting 41 including a suitably sized hole 42 for receipt of an animal head. In preferred embodiments, the animal is acclimated to the somewhat restraining nature of the chambers of the present invention by placing frame 39 around the animal's neck for a suitable amount of time before the animal's head is inserted into port 24. Upon insertion, holes 40 are aligned with studs 44 and nuts or some other suitable fastening means are placed thereupon with sufficient pressure to form a tight seal between frame 39 and flexible collar gasket 43.

The exposure chambers of the invention can be fabricated from a wide variety of engineering materials, including metals, plastics, and composites. The chamber material should be rigid, non-porous, and inert to air and air-borne substances passing through the chamber, or should be a material which can be rendered non-porous and inert through a suitable pretreatment (e.g., coating) process. Particularly preferred materials are transparent plastics, which permit observation of the animals and the chamber interior during use and place less stress on the animals by permitting them to view their external environment.

Air-borne substances according to the invention are materials that can be transported in admixture with a stream of flowing air. Such substances can be in pure form or can themselves be mixtures of materials. They can be solids, liquids, and/or gases, although solid and liquid materials should be in a sufficiently finely divided state and/or of sufficiently low density that they remain in the air steam over a suitable distance of interest. Air-borne materials in the form of powdered solids or small droplets of liquids are preferred.

Exposure chambers according to the invention typically are coupled with air flow means at inlet port 12. The air flow means introduces air into the chamber and transports that air in a generally axial manner to exhaust port 14. Such air (as well as any material borne thereby) should flow with a velocity which matches the intended flow rate for the animal exposure chamber. For the chamber depicted in FIGS. 1–5, for example, this typically will be about 15 to 60 liters per minute (lpm) (0.6 to 2.4 centimeters per second), preferably about 30 lpm (1.2 centimeters per second). A wide variety of suitable air flow means are known to those skilled in the art.

Additional objects, advantages, and novel features of this invention will become apparent to those skilled in the art upon examination of the following examples thereof, which are not intended to be limiting.

EXAMPLE 1

An octagonal rabbit exposure chamber was constructed generally according to FIGS. 1–5 with metal inlet and exhaust plates and clear polycarbonate lateral panels to facilitate observation during exposures. The inlet plate outer diameter was 12 inches, the exhaust plate outer diameter was 24 inches, the plates were positioned 11 inches apart, and there was a distance of 32 inches from the inlet port to the exhaust port. Port-to-port separation was sufficient to prevent contact between the animals. The sloping sides of the octagonal chamber matched the angle at the front of the rabbit restraints. The height of the chambers and the angle of the walls were designed to permit the animals' ears to lay back in a normal position without crimping the ear cartilage. This also insured that the ears, which play a significant role in maintaining thermal homeostasis, were freely exposed to the cool sides of the exposure chamber.

To minimize the potential for heat stress, a cooling system consisting of coiled copper tubing cooled by recirculating cold water (4° C.) was attached to the exhaust plate. Pediatric swim goggles modified to the rabbits' head shape were used to minimize ocular irritation by the exposure atmosphere.

Dental dam collars were glued to polycarbonate collar frames, which could be readily attached to the chamber. This design reduced potential stress of inserting the animals head through a membrane into the chamber. The dental dam collars on the rabbits' necks had an overall leak rate of less than 4% of the total chamber flow rate (30 LPM).

Rabbits were conditioned to the stock, goggles, collars and the exposure chamber for increasing periods of time prior to exposure to test article.

Aerosol was generated using a microprocessor-controlled, pneumatically-activated, multi-metered dose inhaler generator. The aerosol from the generator went directly to the chamber's inlet port and exited from the exhaust port through a HEPA filter. Impactor and filter sample ports were designed to permit sampling at the level of the rabbit's nose. Aerosol concentration was adjusted by changing the number of inhalers fired per minute.

In addition to acclimation to the stocks, goggles and exposure apparatus, many of the animals required repeated touching or petting during the first few days of exposure. By the second week of exposure nearly all of the animals accepted exposure calmly. The modified pediatric swim goggles eliminated the symptoms usually observed when rabbits' heads are exposed to aerosols for which ethanol is the vehicle. The air-only exposed rabbits showed weight gains comparable to animals sham exposed by other routes. The data for the offspring of air-only exposed does did not differ from historical control data for offspring of does exposed by other routes.

Groups of rabbits were exposed head-only for 14 consecutive days. These 150 minute exposures to 0 (Placebo), 0 (Air Only) and three doses of test article were conducted using metered dose inhalers. To prevent ingestion of test article through grooming, rabbits' heads were carefully cleaned after each exposure period. The aerosol generator produced and maintained aerosol concentrations exceeding 2 mg/L in the empty chamber. The aerosol generated was between 1.5 and 3 microns mass median aerodynamic diameter (MMAD), and therefore suitable for rabbit exposures. The spatial distribution studies demonstrated a smaller port-to-port variation (under 25%) than expected for a chamber with plastic sides and a sharp re-entrant angle at the exhaust plate made to accommodate the rabbits ears.

Respirable aerosol concentrations up to 1 mg/L were generated for periods exceeding two hours daily for fourteen successive days.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

What is claimed is:

1. An exposure chamber comprising an air inlet port and an air exhaust port, said ports defining an axis within said chamber;

an inlet plate substantially perpendicular to said axis and in fluid communication with said inlet port, said inlet plate having an outer diameter defining a closed surface shape;

an exhaust plate substantially parallel to said inlet plate and in fluid communication with said exhaust port, said exhaust plate having an outer diameter defining a closed surface shape;

a lateral surface extending between said inlet plate and said exhaust plate;

a plurality of animal ports within said lateral surface, said animal ports being adapted to receive at least a head of an animal and expose said animal to said inlet air.

2. The chamber of claim 1 wherein said shapes defined by said inlet plate outer diameter and said exhaust plate outer diameter are the same.

3. The chamber of claim 1 wherein said shapes defined by said inlet plate outer diameter and said exhaust plate outer diameter are polygons.

4. The chamber of claim 1 wherein said shapes defined by said inlet plate outer diameter and said exhaust plate outer diameter are selected from the group consisting of circles, triangles, tetrahedrons, pentagons, hexagons, heptagons, and octagons.

5. The chamber of claim 1 wherein said lateral surface includes a plurality of panels.

6. The chamber of claim 5 wherein at least one of said panels includes one of said animal ports.

7. The chamber of claim 1 wherein said inlet plate outer diameter and said exhaust plate outer diameter are different.

8. The chamber of claim 7 wherein said exhaust plate outer diameter is from about 1.2 to about 4 times said inlet plate outer diameter.

9. The chamber of claim 7 wherein said exhaust plate outer diameter is from about 1.5 to about 3 times said inlet plate outer diameter.

10. The chamber of claim 7 wherein said exhaust plate outer diameter is from about 1.8 to about 2.2 times said inlet plate outer diameter.

11. The chamber of claim 1 having an inlet surface extending between said inlet port and said inlet plate.

12. The chamber of claim 11 wherein said inlet surface is substantially conical.

13. The chamber of claim 1 having an exhaust surface extending between said exhaust port and said exhaust plate.

14. The chamber of claim 13 wherein said exhaust surface is substantially conical.

15. The chamber of claim 1 further comprising an air flow distributor between said inlet port and said exhaust port substantially along said axis.

16. The chamber of claim 15 wherein said air flow distributor has a conical portion opposite said inlet port.

17. The chamber of claim 1 further comprising a collar frame adjacent said lateral surface and overlying said animal port.

* * * * *